(12) United States Patent
Fossum

(10) Patent No.: US 6,847,398 B1
(45) Date of Patent: Jan. 25, 2005

(54) LATCHED ROW LOGIC FOR A ROLLING EXPOSURE SNAP

(75) Inventor: Erie R. Fossum, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/281,361

(22) Filed: Mar. 30, 1999

Related U.S. Application Data

(60) Provisional application No. 60/080,064, filed on Mar. 31, 1998.

(51) Int. Cl.[7] .......................... H04N 3/14; H04N 5/235; G03B 7/00
(52) U.S. Cl. ........................ 348/296; 348/297; 348/302; 348/308; 348/362; 348/221.1
(58) Field of Search ................................. 348/294–297, 348/302–308, 221.1, 220.1, 362, 311–324; 257/291–293; 250/208.1

(56) References Cited

U.S. PATENT DOCUMENTS

| | | | | |
|---|---|---|---|---|
| 5,410,348 A | * | 4/1995 | Hamasaki | 348/302 |
| 5,541,654 A | * | 7/1996 | Roberts | 348/296 |
| 5,812,190 A | * | 9/1998 | Audier et al. | 348/295 |
| 5,841,126 A | * | 11/1998 | Fossum et al. | 348/308 |
| 5,892,541 A | * | 4/1999 | Merrill | 348/302 |
| 6,088,058 A | * | 7/2000 | Mead et al. | 348/296 |
| 6,175,383 B1 | * | 1/2001 | Yadid-Pecht et al. | 348/297 |
| 6,469,739 B1 | * | 10/2002 | Bechtel et al. | 348/302 |
| 6,529,242 B1 | * | 3/2003 | Panicacci | 348/308 |

* cited by examiner

*Primary Examiner*—Andrew Christensen
*Assistant Examiner*—Nhan Tran
(74) *Attorney, Agent, or Firm*—Dickstein Shapiro Morin & Oshinsky LLP

(57) ABSTRACT

A rolling electronic snap enables each row to integrate for a defined period of time. A control system for the rolling electronic snap includes a latched row logic which latches into reset. The device can be removed from reset in order to integrate. After integrating, the row is selected to receive the information therefrom and then the reset is again maintained. By latching the row in and out of reset, its state can be maintained for longer periods of time.

11 Claims, 14 Drawing Sheets

& # x20;
LATCHED ROW LOGIC FOR A ROLLING EXPOSURE SNAP

CROSS REFERENCE TO RELATED APPLICATIONS

This application claims benefit of the U.S. Provisional Application No. 60/080,064, filed on Mar. 31, 1998, which is incorporated herein by reference.

BACKGROUND

Image sensors are often embodied by a plurality of photo sensitive pixels. Each pixel receives information indicative of a portion of the image. The information is in the form of incoming photocarriers indicative of the incoming light photons. Each pixel accumulates photocarriers indicative of the amount of light impinging on that pixel. That amount of time is often called the exposure.

SUMMARY

The present disclosure describes varying the pixel exposure by varying the time between enabling the pixel to integrate and reading the pixel. The pixels are formed into an array of pixels. Two counters are used to address the array. One counter, called the shutter pointer, keeps track of the address of the pixels that will next be enabled. Once enabled, those pixels will begin to integrate. The other counter called the read counter keeps track of the row address to be read. The time between enabling and reading determines the exposure.

BRIEF DESCRIPTION OF THE DRAWINGS

These techniques will be described with reference to the accompanying drawings wherein.

DESCRIPTION OF THE PREFERRED EMBODIMENTS

The present invention is specifically intended for use in an image sensor of the active pixel type. The specific embodiment uses an active pixel sensor of the type described in U.S. Pat. No. 5,471,515, which uses a CMOS image sensor with an in-pixel source follower and an in-pixel row select transistor. However, any CMOS image sensor or, more generally, any image sensor of any type could be used according to these techniques.

Figure 1:
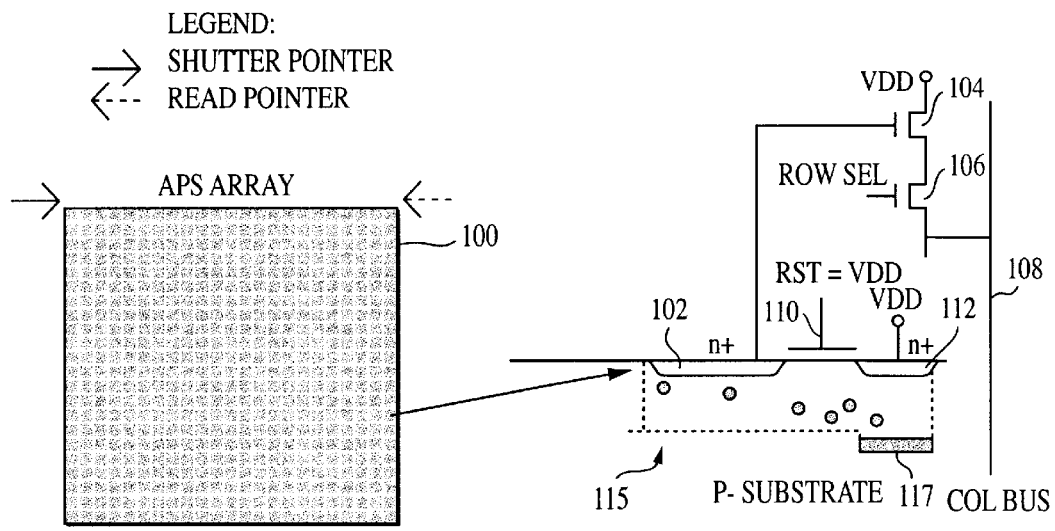
FIG. 1 shows the system with the shutter closed and the array and the reset stayed.

FIG. 1 shows a block diagram of the active pixel sensor array, along with a sample schematic of the way the array can operate. While this system shows a photodiode pixel, it should be understood that this method applies to any kind of pixel including, for example, a photodiode pixel.

When the array is in the reset state, the APS array 100 shows all pixels as being shaded, meaning that all are in the "don't care" state.

The pixels are collectively sampled into an A/D converter using a system with a floating diffusion 102 that is sampled into a source follower 104. The output of the source follower 104 is also sampled through a row selector transistor 106 onto column bus 108. The column bus 108 is coupled into the A/D converter array described herein.

Figure 1A:
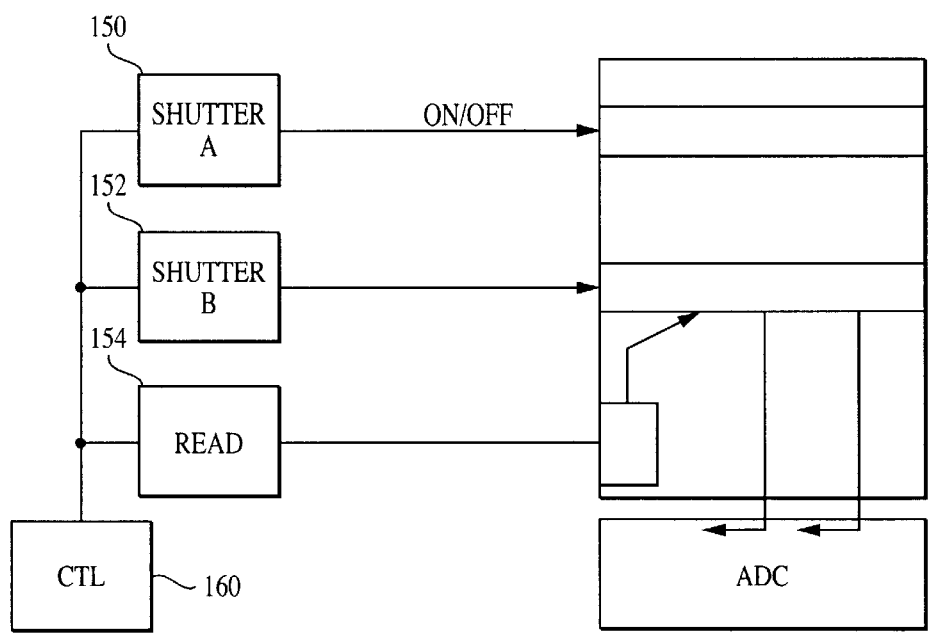

The control circuit is shown in block diagram form in FIG. 1A. Two shutter pointers: shutter A 150 and shutter B 152 are provided. These pointers respectively begin the row integration process by releasing the row from reset. The row is reset by providing a VDD potential on the gate 110 that connects the floating diffusion 102 to a sink well 112. When the reset value is released, the floating diffusion 102 can accumulate charge from incoming photocarriers.

Counter 154 represents the read counter which selects the transistor 106 and thereby provides the output signal to the A/D converters.

In FIG. 1, the shutter is closed meaning that the gate 110 is in the reset state. The potentials of the various elements are shown in state diagram 115: all incoming photocarriers are sinked to the well 117.

Figure 2:
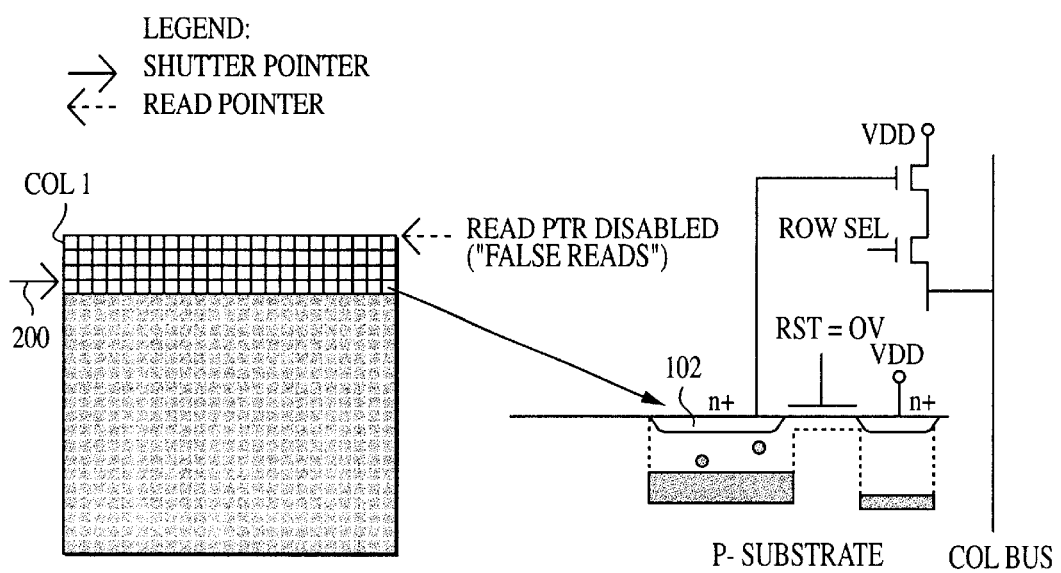
FIG. 2 shows the start of exposure.

In FIG. 2, the exposure is started. This is done by advancing the shutter counter (shutter A 150) through the array selectively releasing the array from reset. The rate at which the opening is advanced through the array is equal to the read row rate. The operation occurs by releasing the reset to each row in a timed manner. The timing is controlled by controller 160 which can be dedicated logic or a microprocessor.

FIG. 2 shows how the states change when reset is released. Each floating diffusion begins to integrate charge once released. The read pointer is disabled, to avoid any false reads.

In this example of FIG. 2, column 4, shown by pointer 200, is being advanced cyclically. Therefore, column 1 has been opened for the time of 4 clock rate exposures.

Figure 3:
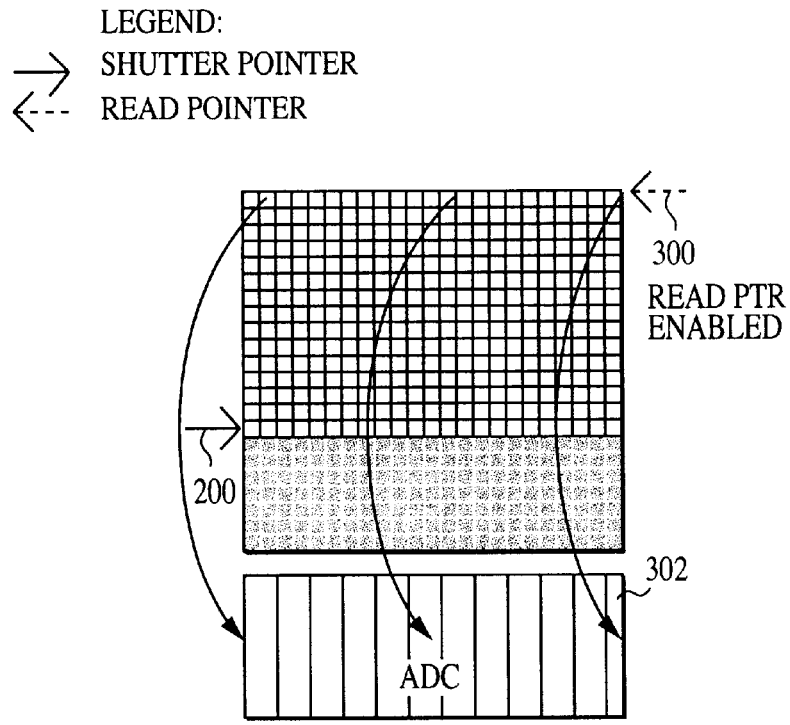
FIG. 3 shows the advance of the shutter.

FIG. 3 shows the operation continuing. Pointer 200 has now reached the 15th row and in this example, we assume that 15 exposure cycles are desired for a total exposure time of 15–N where N is a time between subsequent advances of the shutter. When N=15, the read pointer 154 is enabled; shown as element 300. The enabling of read pointer 300 enables the row select 106 and thereby provides the charge from that row onto the column bus 108 into associated A/D converter 302. In this example, therefore, the first row of the array is read into the column processing A/D circuits. The shutter advancing speed matches the row processing speed. Here, the shutter width equals 14 rows and the pixel integration time equals 14 times the process time per row.

After reading out the row, the reset for that particular row is again brought high to maintain the pixel and reset.

Figure 4:
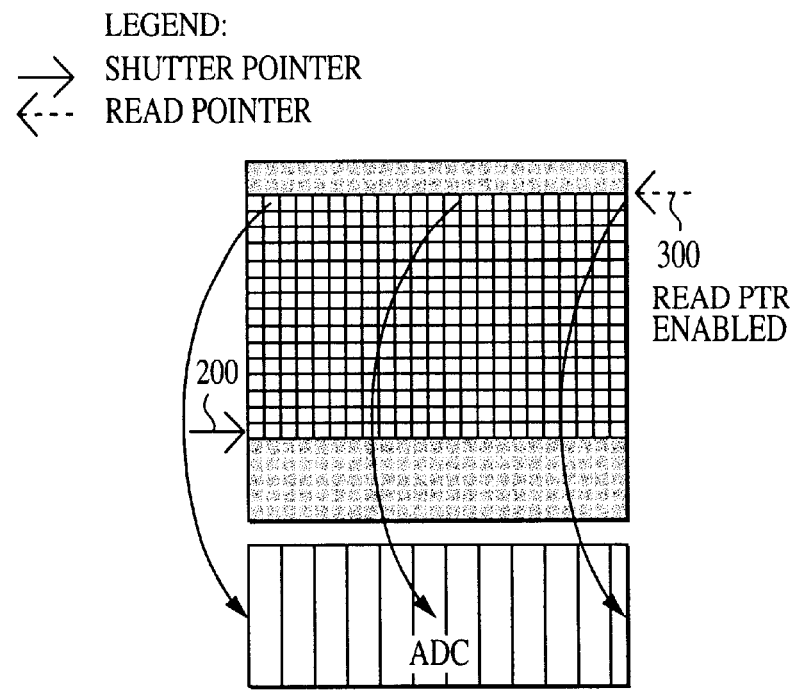
FIG. 4 shows how each row is read into an analog to digital converter and the shutter is closed behind it.

FIG. 4 shows the continuation of the process. The read pointer 300 is always 15 rows behind the shutter pointer 200. Each row is read into the A/D converter, and the shutter is closed behind it by bringing the appropriate reset transistor 110 into reset.

Figure 5:
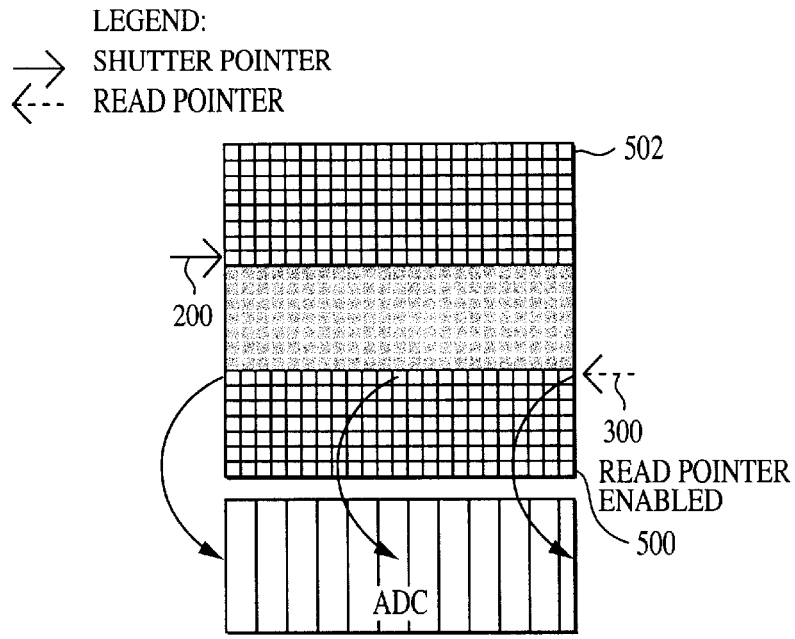
FIG. 5 shows the positions of the read pointer and shutter pointer as the process continues.

FIG. 5 shows the way in which the pointers wrap around. When the shutter pointer reaches the bottom 500 of the array, it wraps back around to the top 502 of the array. The read pointer is still reading behind the time of the shutter pointer enablement.

Figure 6:
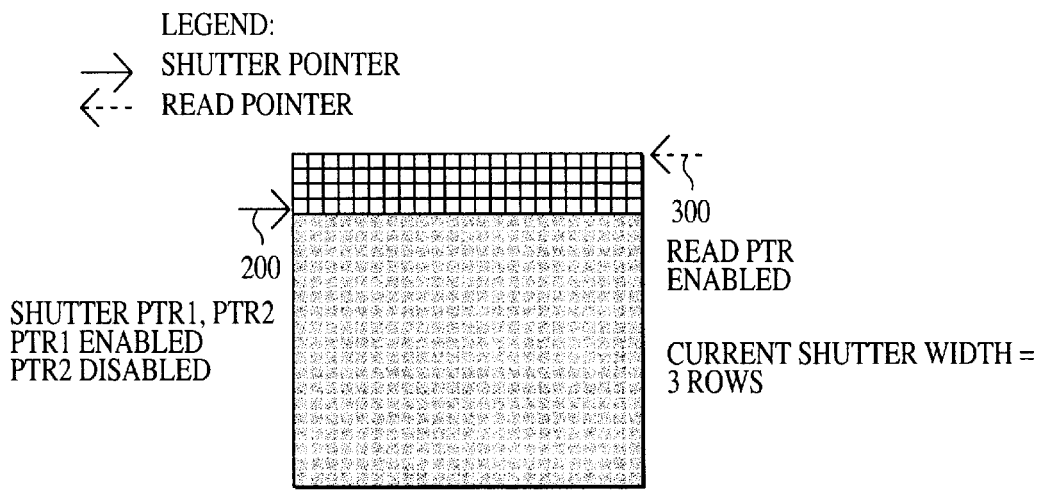
FIG. 6 shows the first step in a process of changing the exposure.
Figure 5A:
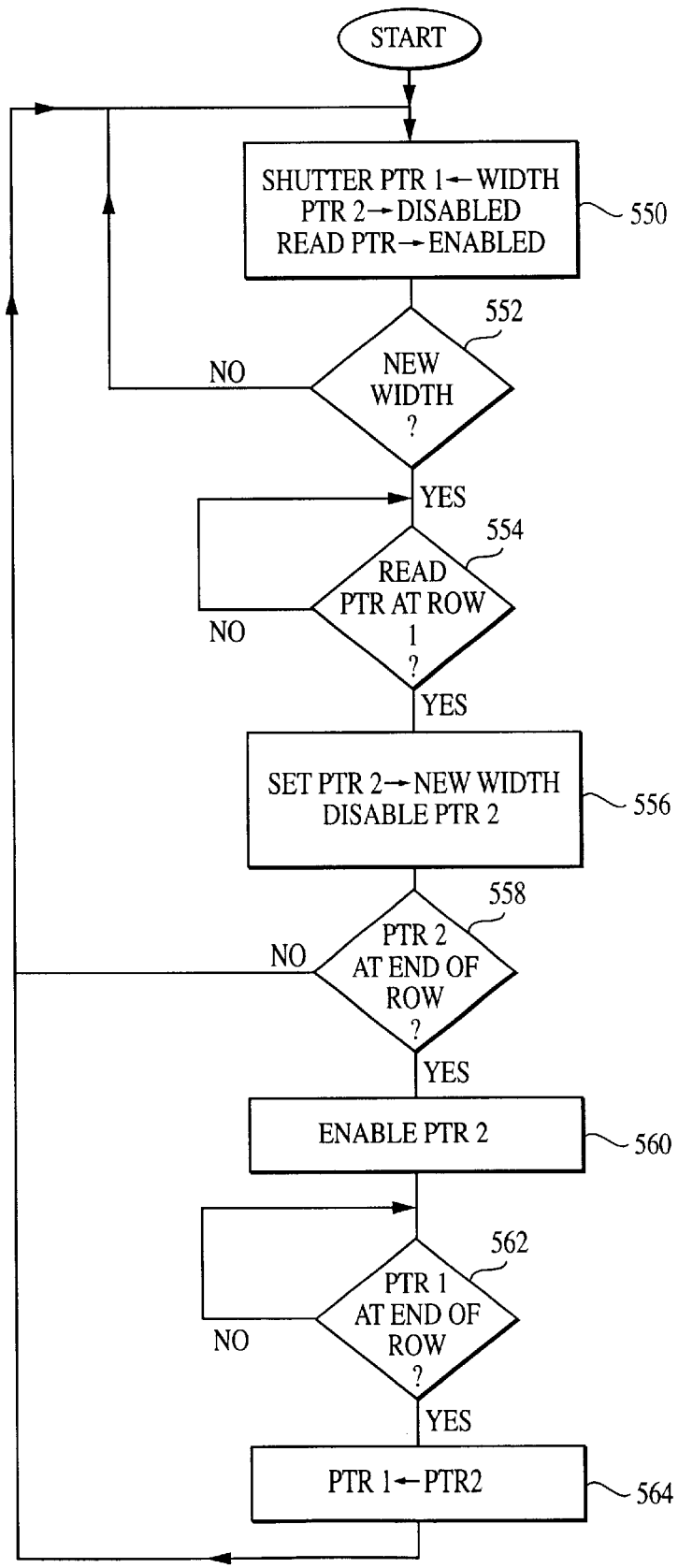

The operation of selecting a new frame is shown in the flow chart of FIG. 5A and with reference to FIGS. 6–14. FIG. 6 shows the beginning of a new frame. As shown in step 550 of the flow charge of FIG. 5A, the shutter pointer 1 is set to the desired width, pointer 2 is disabled, and the read pointer is enabled. The read pointer tells the pixels to be read a specified amount of time after the shutter pointer has enabled them. FIG. 6 shows the system operating with the current shutter width of three rows.

Figure 7:
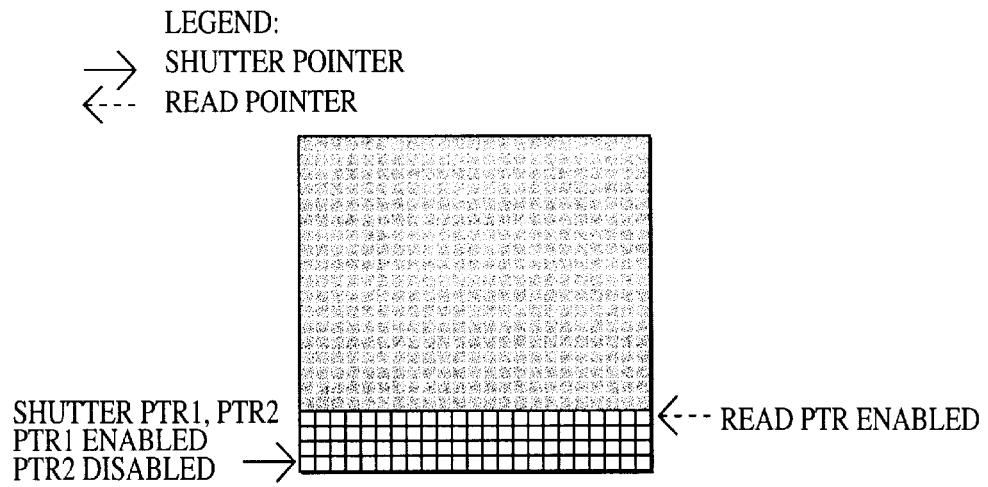
FIG. 7 shows the shutter conditions at the bottom of that window.
Figure 8:
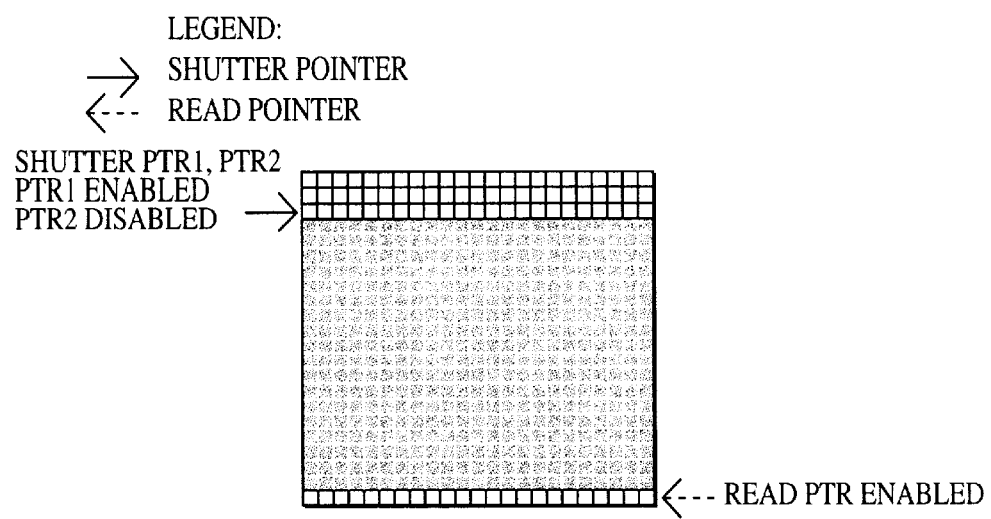
FIG. 8 shows the bottom of the window and the beginning of the next window.
Figure 9:
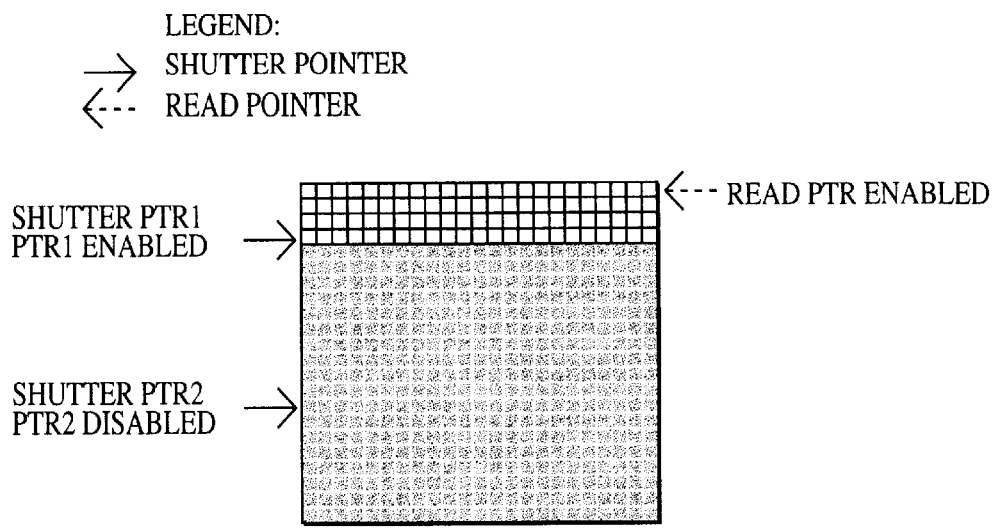
FIG. 9 shows the complete new frame with the set up shutter width.
Figure 10:
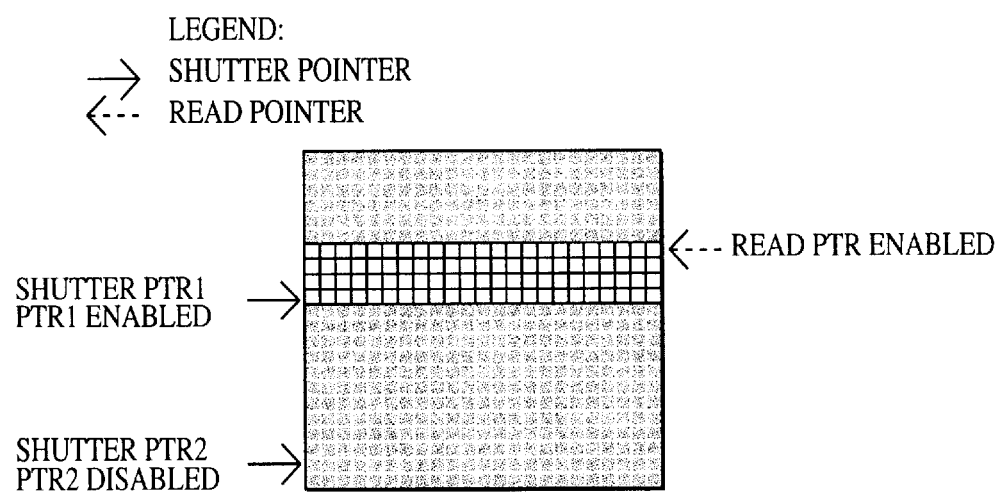
FIG. 10 shows continuation of the reading.
Figure 11:
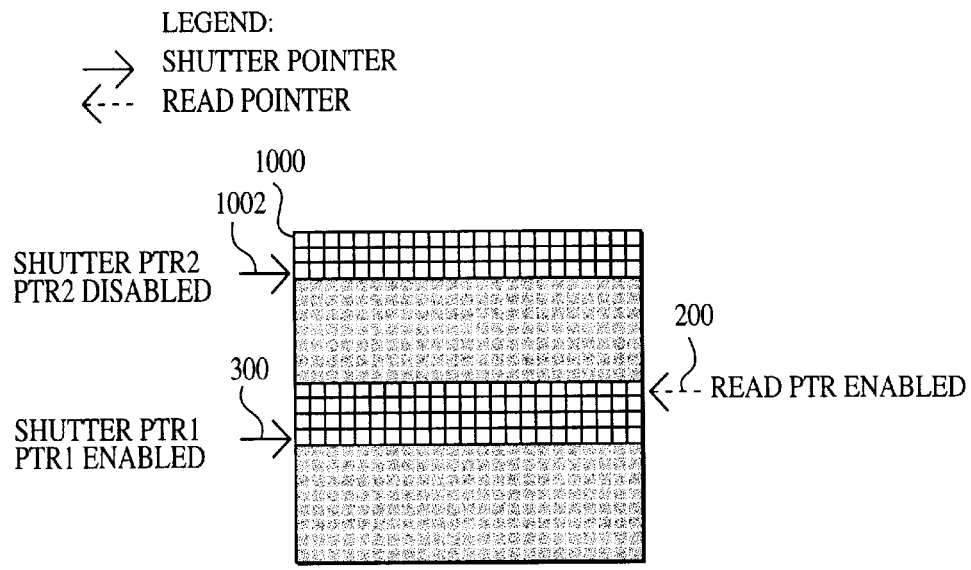
FIG. 11 shows the new pointer initiating a new shutter width.
Figure 12:
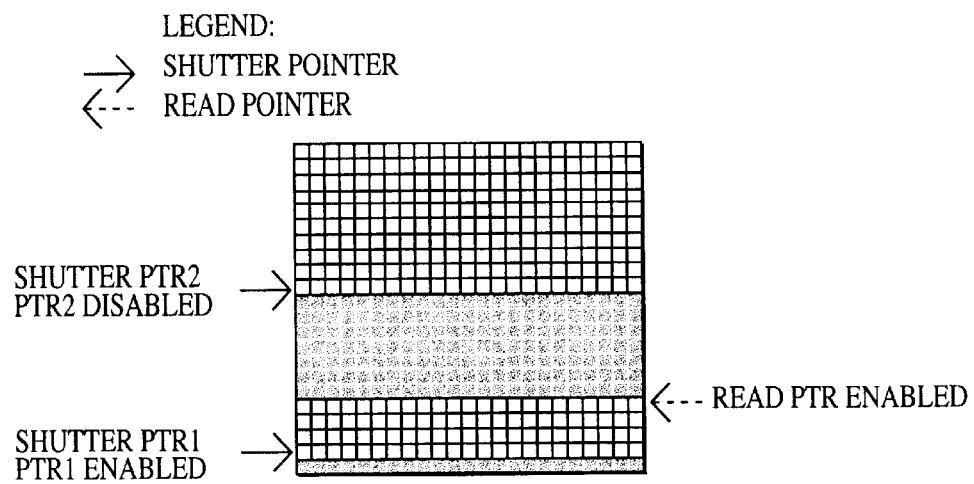
FIG. 12 shows the continuation of the reading with both shutters enabled.
Figure 13:
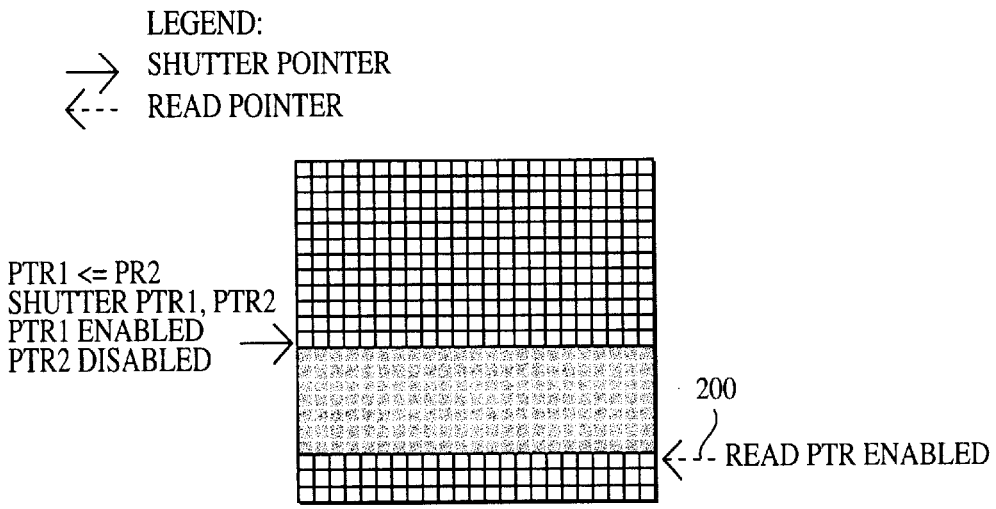
FIG. 13 shows the first shutter pointer wrapping around loaded with the second shutter pointer value.
Figure 14:
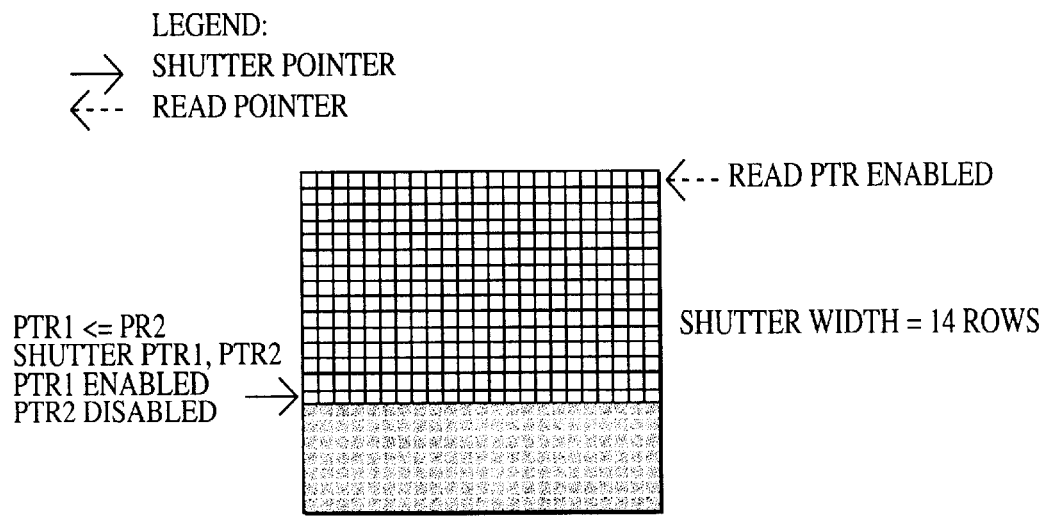
FIG. 14 shows the new frame starting with the updated shutter width.

Some time after the operation of FIG. 6, the user enters a new shutter width as shown in step 552. The new shutter width in this example is 14 rows although it could be any value. FIG. 7 shows the shutter reaching the bottom of the window. FIG. 8 shows the read pointer reaching the bottom of the window and FIG. 9 shows the read pointer reaching the top of the window. When the read pointer reaches the top, as detected at step 554, the shutter pointer number 2 is set to the new width. However, pointer number 2 remains disabled at this time and through the subject of FIG. 10 where it moves in step with pointer 1 and the read pointer. This is represented as step 556 in FIG. 5A. When pointer number 2 reaches the end of the row, as detected at step 558 and shown in FIG. 11, it is enabled to initiate the new shutter width. The read pointer 200 is still reading three rows behind the shutter pointer 1 300. However, subsequent top rows such as 1000 are being turned on by shutter pointer 2 1002. This is shown generally as step 560 in FIG. 5A. The reads continue as shown in FIG. 12. When pointer 1 reaches the bottom of the row, in step 562 in FIG. 13, pointer 1 receives the contents of pointer 2 (step 564) and wraps around loaded with the value of pointer 2. Therefore, when the read pointer 200 reaches the bottom of the row, the bottom-most row receives the last three row exposure. The top of the next row, shown in FIG. 14, has a 14-row shutter width.

Figure 15:
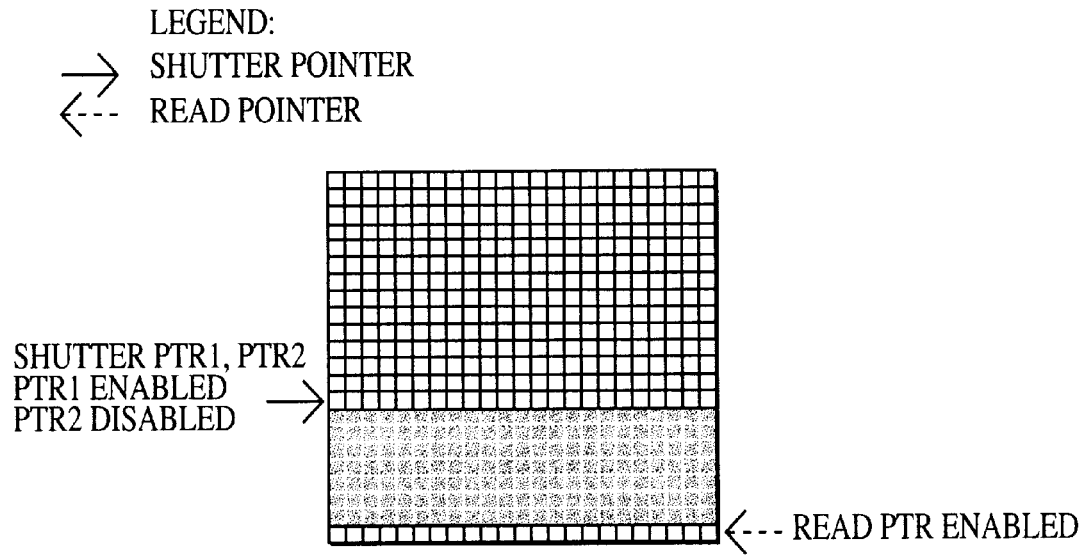
FIG. 15 shows the beginning point of a user entering a new shutter width which is smaller than the old shutter width.
Figure 16:
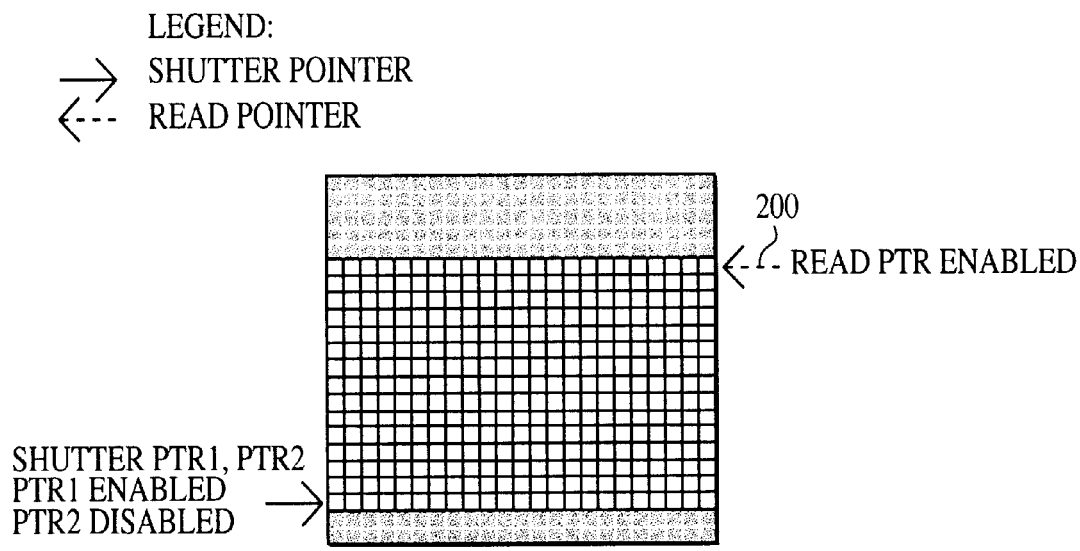
FIG. 16 shows the shutters enabled and disabled as the bottom of the current array is reached.
Figure 17:
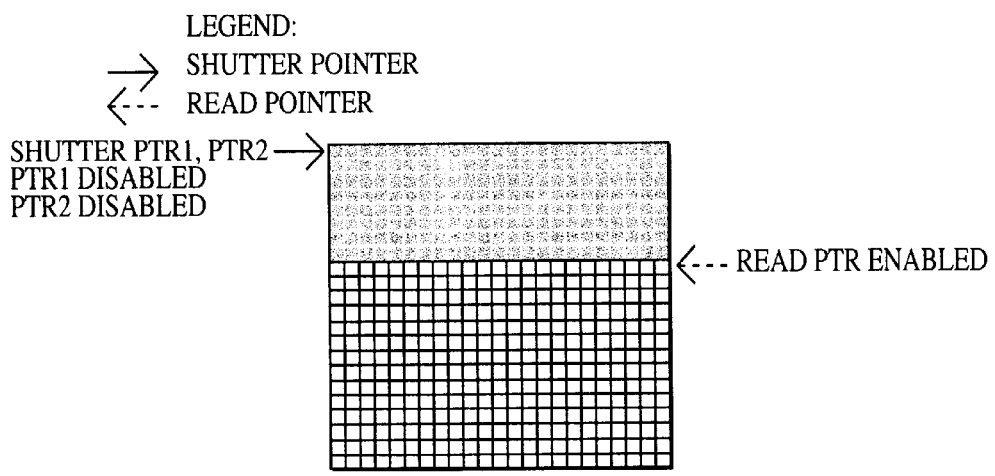
FIG. 17 shows the shutter pointer wrapping around and waiting for the read pointer to collapse the shutter width.

The opposite operation is carried out for shortening the row as shown in FIG. 15. FIG. 15 represents the time when the user enters a new shutter width that is smaller. FIG. 15 shows a 14-width row, and the new shutter width is 8 rows. An analogous operation occurs, with FIG. 16 showing the read pointer 200 and 2 shutter pointers.

Figure 18:
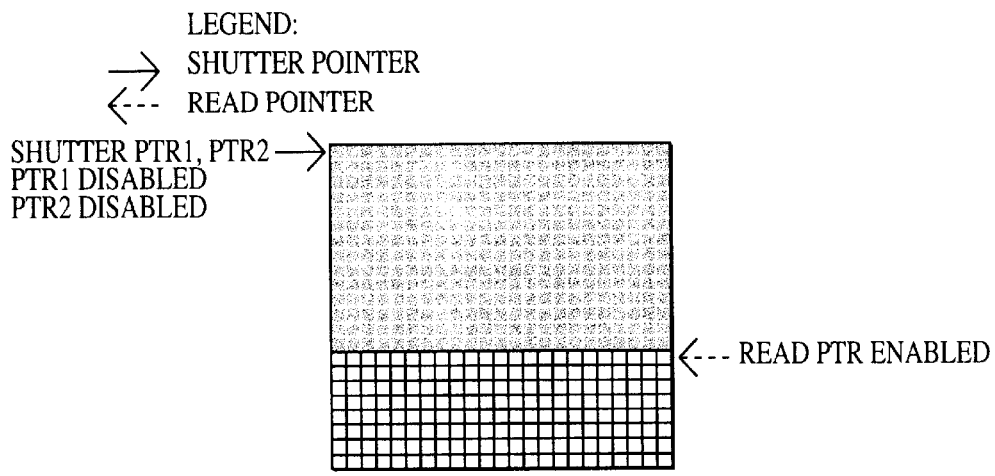
FIG. 18 shows the continuation of the shutter pointer as it continues to wait.
Figure 19:
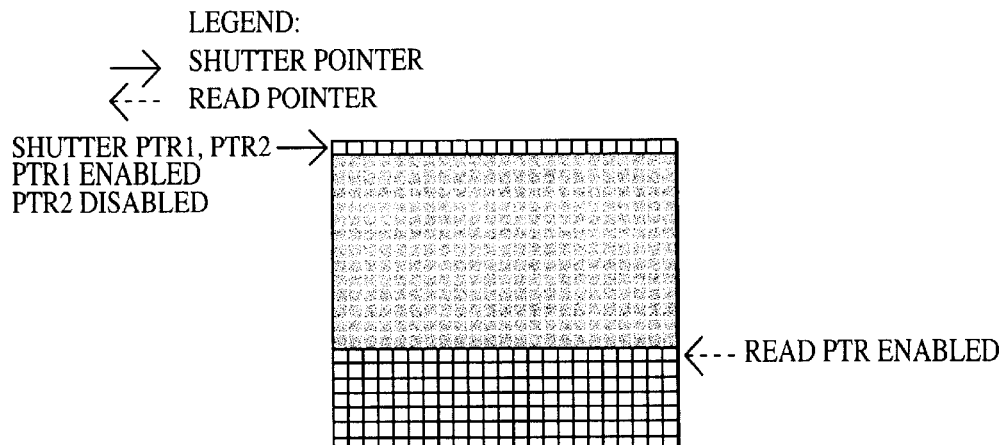
FIG. 19 shows the shutter pointer starting the next frame with the new collapsed shutter width.
Figure 20:
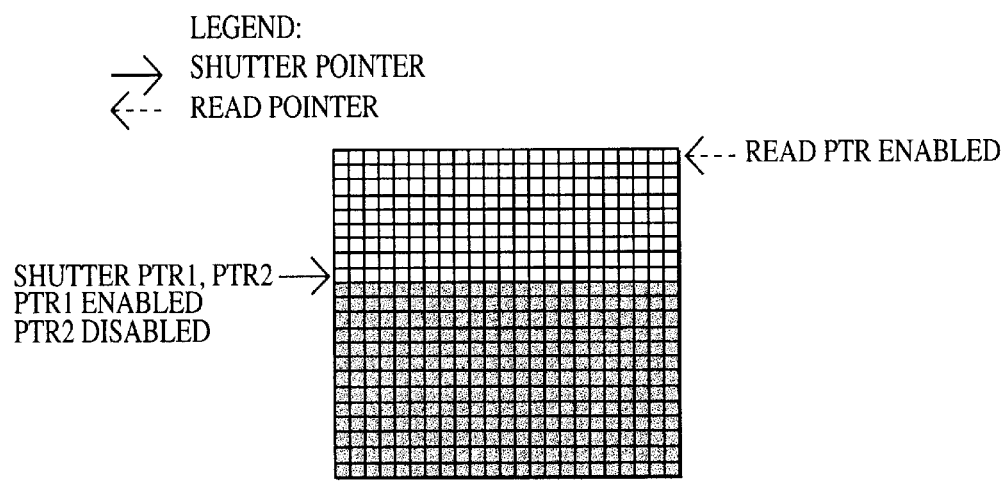
FIG. 20 shows the new frame with the updated shutter path.

When the read pointer wraps around, the read pointer is still 14 rows behind the shutter pointer. The shutter pointer, however, does not change value until the read pointer collapses the shutter width to 8 rows as shown in FIG. 18. At that time, the shutter pointer starts moving again as shown in FIG. 19. The new frame with updated shutter width is shown in FIG. 20.

The system described herein could be carried out using a processor or hard-wired logic. The preferable way to do this is digital control of the logic using gates defined in hardware description language or HDL.

This system is called a rolling electronic snap. The rolling electronic snap uses latches in the row logic to selectively enable the pixels to start integrating. Typically, two addresses are stored for controlling the pixel array: one for reading, the other enabling the pixel row to integrate.

Figure 21:
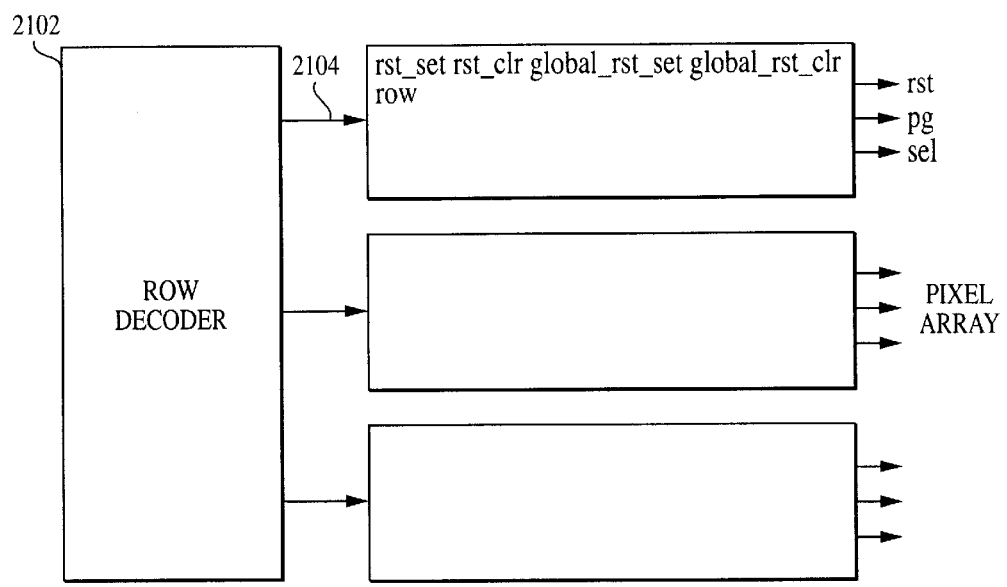
FIG. 21 shows a block diagram of latched row logic for this system.

FIG. 21 shows a latched row logic system for an electronic snap of this type.

The rolling electronic snap effectively defines a slit of integrating information that travels across the array of pixels. The beginning of the snap sets the time when the pixel starts integrating. The end of the snap sets when it stops.

The row logic for an active pixel sensor array typically includes decoder logic which decodes signals to produce output such as row select/column select, and also logic to control the state of the pixel reset. Other pixel controls may also be necessary or desirable. For example, in a photogate type image sensor, a control to control the bias state of the photogate may be necessary. Other controls such as pixel reset may be useful.

The present system defines a special latched addressing element 2100. This approach uses a latched control for pixel control signals in the row logic. Each row has its own circuit portion which is set and reset. The latches may be globally set or cleared, and also can be individually set or cleared.

Previous systems typically used a row decoder 2102 which produced a row enable signal 2104 for each row. Similar row enables are also used in this system to facilitate use with previous designs. FIG. 21 shows a simplified logic diagram for only three of the rows. Within the device 2100, the decoder output is gated with a number of control signals 2106. The control signals include RST_SET (reset), RST_CLR, GLOBAL_RST_SET, and GLOBAL_RST_CLR.

Figure 22:
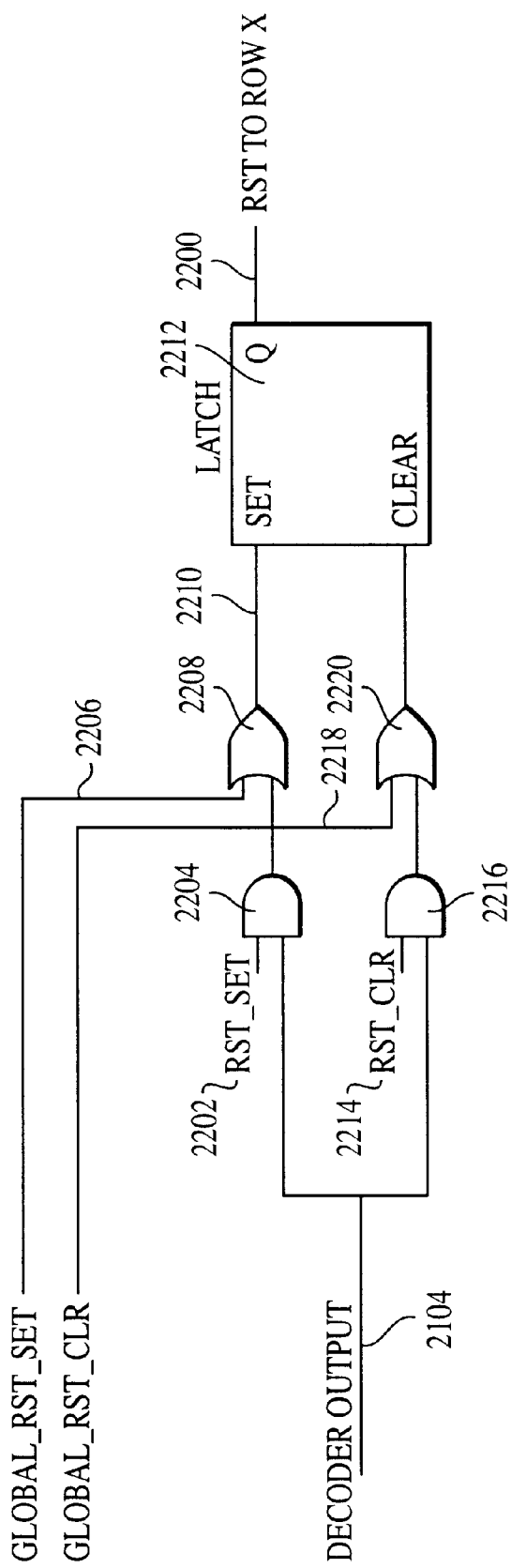
FIG. 22 shows a gate level diagram of the latched row logic.

The logic gate diagram is shown in FIG. 22. When the decoder row output 2104 is active, the latches for reset 2200 are enables. Reset set (RST_SET) signal 2202 then toggles AND gate 2204 to output a signal. Therefore, when the decoder row output becomes active, the reset set 2200 passes through the gate 2204 where it is ORed with the global reset 2206 by OR gate 2208. The rolling electronics snaps enables a row to be enabled for integration for a variable time.

The inventor realized that a new way of addressing could be useful in such a system. For example, this allows multiple rows to be held in reset, while others are held in integrate. Hence, if either, (decoder output active and reset local output active) or (global reset) active is true, then the output 2210 sets the latch 2212, thereby providing a reset for row X that is held. Similarly, the reset state can be cleared using the reset clear (RST_CLR) signal 2214 with the AND gate 2216 where it is ANDed with the decoder output 2104. This output is ORed with the global reset clear 2218 using OR gate 2220. The output is used to clear the latch which can be, for example, a simple cross-connected set of AND gates connected as a flip-flop. In operation, therefore, the system normally maintaining all rows in reset, at an integration start time, removing the row from reset (using the RST_SLR signal) and then sometime later reading out the information and again resetting. An advantage of this system, however, is that individual passes through the system are necessary, and the system stays in its previously-selected state between these.

This system enables the user to select portions of the image array that may integrate, and portions that are held in the non-integrating mode, thereby setting the shutter width of the rolling electronic snap. Since the rows are latched on and off, the control system needs only to turn on the latch at one time, and come back N rows later (where N is the length of the integration time) to turn the latch off. Different exposure times can be therefore set for the same image frame rate. For example, the frame rate can be set to 30 Hz, i.e., standard video. The integration time for the pixel may be sent to any value equal to or less than 33 ms. Since the control system needs only to turn on and off the latches at specified times, this also facilitates a number of windows within the pixel array being set to integrate in a rolling mode.

Embodiments are contemplated and are supported by the claims.

What is claimed is:

1. A system for controlling a pixel sensor, the system comprising:

an array of pixel sensors, each pixel sensor configured to obtain light, and convert said light to an electrical signal indicative thereof, said array arranged in functional blocks which are made up of rows; and a readout control system for said array, said readout control system including a controller which first controls a desired functional block to begin integrating at a first time, later, at a time after said first time, controls said functional block to readout information therefrom, said controller including a latched control part which at a first time is set to hold a selected functional block in an integrating mode and at a second time is reset to hold said functional block in a reset mode, wherein each of said pixel sensors are active pixel sensors having a CMOS image sensor, and an in-pixel buffer transistor and an in-pixel select transistor, and wherein said readout control system reads out said information by enabling said select transistors for a selected block and wherein said readout control system further comprises a row decoder, wherein said row decoder comprises a set/reset type latch, driven by a first set signal and second set signal, said first set signal comprising a combined signal for global reset or individual reset and said second set signal comprising a combined signal from a global set and an individual set.

2. The system of claim 1, wherein said set/reset type latch of said readout control system can be operated such that a row of said array may have a different integration time each time it is activated for integration.

3. The system of claim 1, wherein said readout control system maintains a previously selected state during readout of said rows.

4. The system of claim 1, wherein said readout control system allows for a portion of said array to be integrated and a portion of said array to not be integrated.

5. The system of claim 4, wherein said readout control system allows a user to select the portion of said array to be integrated.

6. The system of claim 4, wherein said readout control system allows for the portion of said array not integrated to be held in reset.

7. The system of claim 4, wherein a determination by said readout control system of said integrated portion of said array and the portion of said array not integrated sets a shutter width of an exposure.

8. The system of claim 1, wherein said readout control system turns on said set/reset type latch for a row, delays for a period of time and turns said set/reset type latch off.

9. The system of claim 8, wherein said period of time is an integration period.

10. The system of claim 1, wherein said readout control system allows for different exposure times to be set for a given image frame rate.

11. A row logic latch control apparatus for controlling readout of an array of pixel sensors comprising:

a set/reset type latch;

a first signal block connected to said set/reset type latch wherein said first signal block provides a set/reset signal to said set/reset type latch when a predetermined logical relationship exists between a row decoder output signal, an individual reset signal and a global reset signal; and a second signal block connected to said set/reset type latch wherein said second signal block provides a clear signal to said set/reset type latch when a predetermined relationship logical exists between said row decoder output signal, an individual clear signal and a global clear signal.

* * * * *

UNITED STATES PATENT AND TRADEMARK OFFICE
CERTIFICATE OF CORRECTION

PATENT NO.    : 6,847,398 B1
DATED         : January 25, 2005
INVENTOR(S)   : Eric R. Fossum It is certified that error appears in the above-identified patent and that said Letters Patent is hereby corrected as shown below:

Title page,
Item [75], Inventor, "Erie R. Fossum" should read -- Eric R. Fossum --.

Column 4,
Line 51, "enables" should read -- enabled --; and
Line 55, "electronics snaps" should read -- electronic snap --.

Signed and Sealed this

Twenty-seventh Day of December, 2005

JON W. DUDAS
*Director of the United States Patent and Trademark Office*